(12) United States Patent
Richter et al.

(10) Patent No.: US 8,011,393 B2
(45) Date of Patent: Sep. 6, 2011

(54) PROCESS AND DEVICE FOR FILLING A TUBE WITH GRANULAR MATERIAL

(75) Inventors: Peter Richter, Schwarzbach (DE); Peter Markowski, Merseburg (DE); Mike Dittman, Lauchhammer (DE)

(73) Assignee: Unidense Technology GmbH, Schwarzheide (DE)

( * ) Notice: Subject to any disclaimer, the term of this patent is extended or adjusted under 35 U.S.C. 154(b) by 0 days.

(21) Appl. No.: 12/599,777

(22) PCT Filed: Aug. 13, 2008

(86) PCT No.: PCT/EP2008/006646
§ 371 (c)(1),
(2), (4) Date: Mar. 12, 2010

(87) PCT Pub. No.: WO2009/021723
PCT Pub. Date: Feb. 19, 2009

(65) Prior Publication Data
US 2010/0218843 A1    Sep. 2, 2010

(30) Foreign Application Priority Data
Aug. 13, 2007 (NL) ..................................... 1034249

(51) Int. Cl.
*B65B 1/20* (2006.01)
(52) U.S. Cl. ............... 141/73; 141/12; 141/71; 141/286
(58) Field of Classification Search ............... 141/1, 11, 141/12, 71, 73, 250–263, 284, 286; 222/406, 222/407, 564; 239/379; 414/160, 287, 804, 414/808
See application file for complete search history.

(56) References Cited

U.S. PATENT DOCUMENTS

| 3,608,751 | A |   | 9/1971  | Hundtofte |
|-----------|---|---|---------|-----------|
| 3,749,258 | A | * | 7/1973  | James ........................... 414/808 |
| 4,266,740 | A | * | 5/1981  | Ramos et al. ............... 242/532.6 |
| 4,306,829 | A | * | 12/1981 | Loutaty et al. ................ 414/301 |
| 4,461,327 | A |   | 7/1984  | Magin |
| 5,228,484 | A | * | 7/1993  | Johnson ........................... 141/65 |
| 5,247,970 | A | * | 9/1993  | Ryntveit et al. ................... 141/1 |
| 5,687,780 | A | * | 11/1997 | Minami ........................ 141/286 |
| 6,182,716 | B1 | * | 2/2001  | Fry ................................. 141/67 |
| 6,360,786 | B1 | * | 3/2002  | Fry ................................. 141/67 |
| 6,467,513 | B1 | * | 10/2002 | Yanaru et al. ................... 141/12 |
| 6,981,422 | B1 |   | 1/2006  | Comardo |
| 7,597,529 | B2 | * | 10/2009 | Diehl et al. ................... 414/804 |
| 7,712,490 | B2 | * | 5/2010  | Brennom ........................ 141/12 |
| 7,770,613 | B2 | * | 8/2010  | Brennom ...................... 141/250 |
| 2002/0129642 | A1 |   | 9/2002  | Johns |

FOREIGN PATENT DOCUMENTS

| EP | 1374985 A1 | 1/2004 |
|----|------------|--------|
| EP | 1749568 A1 | 2/2007 |
| WO | WO A1 PCT/US04/12390 | 11/2004 |
| WO | WO A1 PCT/EP04/09226 | 3/2005 |

* cited by examiner

*Primary Examiner* — Timothy L Maust
(74) *Attorney, Agent, or Firm* — Leydig, Voit & Mayer, Ltd.

(57) ABSTRACT

A process for filling a tube with granular material, which material is guided downwardly in a vertically oriented tube along a line provided with flexible elements in the shape of wires which are arranged substantially to the line, and having a radial dimension which is smaller than the inner diameter of the tube, the line being removed from the tube as the latter is filled with the granules, the line being moved during the removal movement with a non uniform speed which is related to the filling speed of the device.

10 Claims, 2 Drawing Sheets

PROCESS AND DEVICE FOR FILLING A TUBE WITH GRANULAR MATERIAL

The invention relates to a process for filling a tube with granular material, which material is guided downwardly in a vertically oriented tube along a line provided with flexible elements in the shape of wires which are arranged substantially to the line, and having a radial dimension which is smaller than the inner diameter of the tube, the line being removed from the tube as the latter is filled with the granules.

Such a process is known from the European Patent specification EP-B-0 548 999.

In this known process the line is gradually moved upwardly during the filling of the tube. This can lead to problems in that the granular material can accumulate on the wire elements thereby disturbing the filling process. This can more specifically occur in that the filling process is not harmonized with the gradual upward movement of the line during the filling of the tube with granular material.

It is an object of the invention to provide a process of the above mentioned character in which this problem has been avoided.

This object is achieved in that the line during the upward movement is moved with a non-uniform speed related to the filling speed of the device.

By making the movement of the line non-uniform the risk for accumulation of granules on the wire elements is substantially reduced.

Preferably the movement of the line is performed in a shocking way.

The invention also relates to a device for performing the process according to the invention.

Such a device comprises a flexible line provided with flexible wire elements perpendicular to the line and fitting with the tube and means for moving the line upwardly and downwardly in a tube to be filled. The device is characterized in that the means for moving the line comprises elements which are causing a varying speed of movement of the line.

These elements can consist of a step motor, which is controlled with a discontinuous series of pulses, or the elements comprises a reel with a surface with a cross section which is not circular, for example polygonal. In this way a shocking movement can be obtained.

Figure 1:
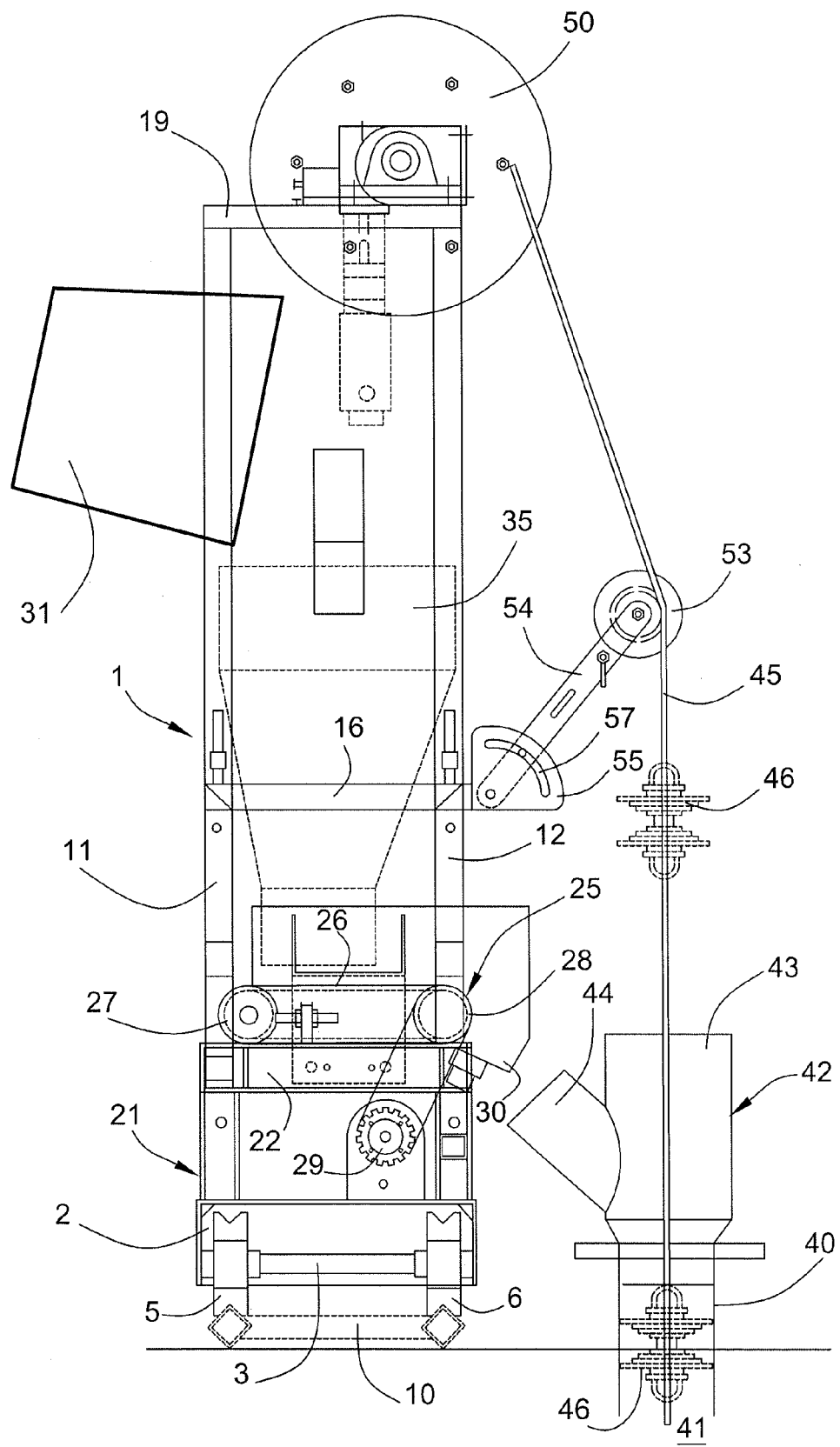
Figure 2:
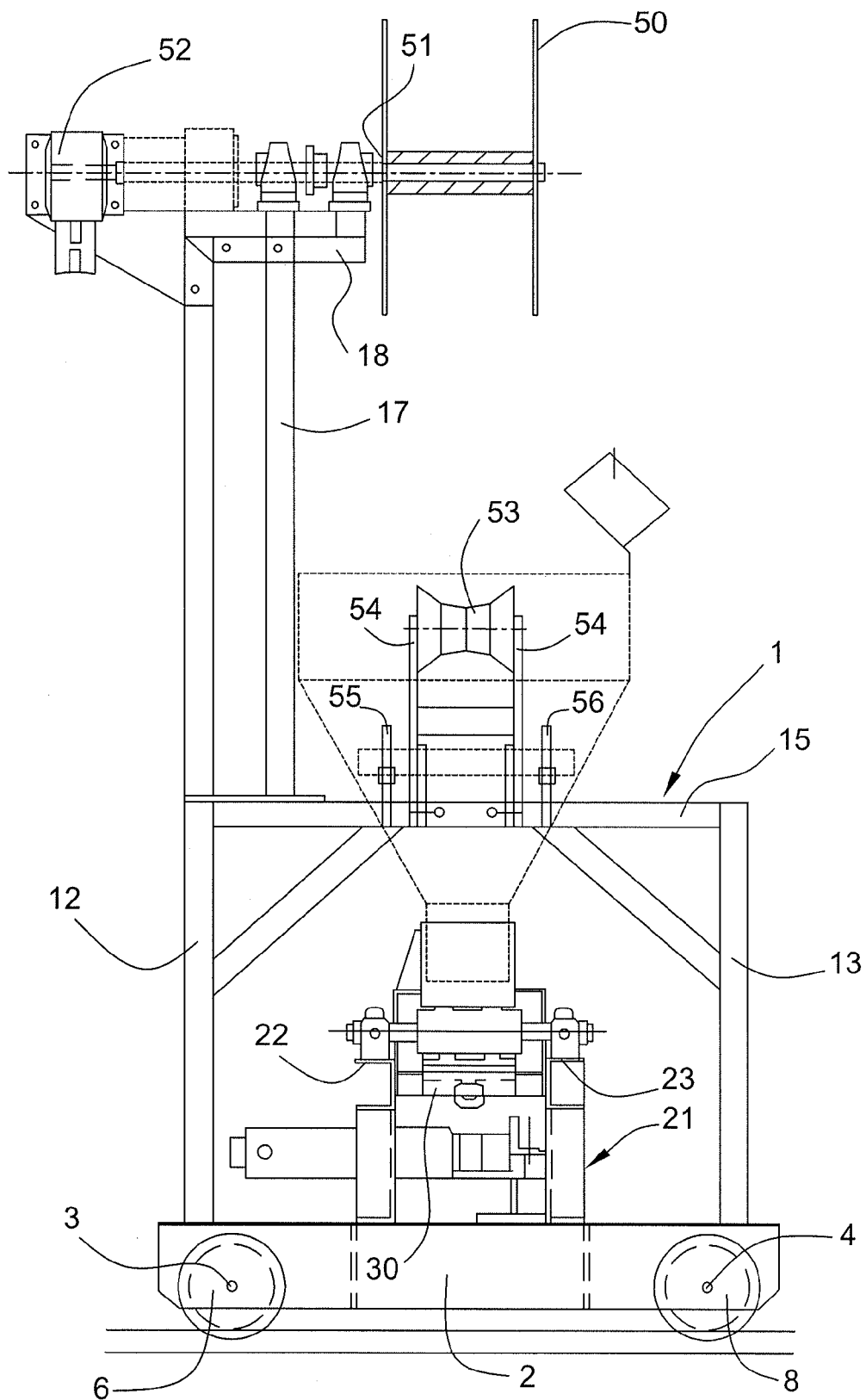

Other characteristics and advantages of the invention will become clear from the following description reference being made to the annexed drawings in which:

FIG. 1 is a schematic representation in front view of a filling device according to the invention, and FIG. 2 is a schematic side view of the device of FIG. 1.

The filling device as shown in the FIGS. 1 and 2 comprises a bottom part 2 in the shape of a U-shaped profile.

Between the flange plates of the U-shaped profile 2 two axis 3 and 4 are rotatably mounted two wheels 5, 6 and 7, 8 respectively being mounted on each axis 3, 4, so that the filling device can be easily moved. The wheels 5, 6, 7 and 8 have a circumference which in cross section has a V-shape. On the floor won which the filling device must be moved there is provided some kind of a rail system 10 which essentially comprises two parallel profiles square cross section, which are interconnected and each profile with square cross section being oriented in such a way that one of its diagonals is positioned vertically.

A number of vertical profiles 11, 12, 13 and 14 is connected to the U-shaped profiles 2, the length of the profiles 11, 12 being bigger than the length of the profiles 13, 14. In a horizontal plane at the height of the upper ends of the profiles 13, 14 there is provided a number of profiles (15, 16 are shown) interconnecting the profiles 11, 12, 13, 14 thereby forming a rectangular frame.

The upper ends of the profiles 11 and 12 are interconnected by means of a profile 19. On the profile 15 and a profile not shown which is parallel to this profile, there is mounted a vertical profile 17 and a not shown vertical profile the upper ends of which are positioned in the same horizontal plane as the upper ends of the profiles 11, 12.

A horizontal profile 18 and a not shown profile which is parallel therewith connect the upper ends of the profiles 12, 17 and 11 and the not shown vertical profile.

A subframe 21 is mounted on the U-shaped profile 3, which subframe consists of four vertical profiles and two parallel horizontal profiles 22, 23 which rest on two of the four vertical profiles.

On the subframe 21 a transport system 25 has been mounted comprising a transport belt 26 which arranged on two rollers 27, 28 on which can be rotatably driven though a motor 29. At one end of the transport system 25 a gutter 30 has been placed.

On the horizontal frame part constituted by the profiles 15, 16 a filling hopper 30 has been mounted having a discharge opening which ends above the transport belt 26, the distance between the upper part of the belt 26 and the discharge opening at the lower end of the filling hopper 25 being adjustable in such a way that a regulated flow of granular material from the filling hopper 25 can be obtained which is regulated by the speed of movement of the transport belt 26. The filling hopper can be replenished through the upper side.

The rail system 10 extends along a number of openings in the floor on which the rail system is positioned, which openings are used for accommodating the tubes which must be filled with the granular material. In FIG. 1 there is shown a tube 40 which is positioned in the opening 41. On top of the upper end of the tube 40 a filling funnel 42 has been placed, which consists of a cylindrical part 43 the lower end of which fits on the tube 40 and which is in communication with a second hollow cylindrical part 44 the axis line of which making an angle with the axis line of part 43. When the device 1 is in position for the tube 40, the upper end of the cylindrical part is positioned under the discharge opening of the gutter 30 so that the granular material flows through the cylindrical part 44 into the cylindrical part 43 and from there into the tube 40.

In order to fill the tube 40 in a uniform way and with sufficient density a flexible line 45 has been provided which is provided with a number of flexible wire elements 46 which are oriented substantially perpendicular with respect to the line 45.

The principle of the operation of such a line has been described in more detail in the European patent specification PE-B-0 548 999 mentioned above.

In the embodiment shown one end of the line 45 is connected to a reel 50 which is rotatably mounted on the profiles 18, 19 and the axis 51 of which is connected to a motor 52, in such a way that the line can be move up and down in a tube 40 to be filled. From the reel 50 the line 45 is guided through guiding roller 53 to the tube 40.

The guiding roller 53 is rotatably mounted on a axis 54, the other end of which being rotatably connected to the profile 15.

On the profile 15 two plates 45, 46 have been mounted at both sides of the arms 54. IN these plates 55, 56 grooves 57 have been made in the shape of a quarter of a circle. At the height of the groove 57 openings have been made in the arms 54 so that a bolt can extend through the groove 57 and the openings. By means of a nut the bolt can be fixed and the arms

54 positioned in any angular position. In this way the vertical part of the line can be positioned exactly within a predetermined zone.

The movement of the line 45 is controlled by the movement of the reel 50.

According to a first embodiment of the invention the motor 52 is a step motor which is controlled by means of e series of pulses. By assigning an irregular character to the series of pulses, especially during the upward movement of the line 45 it is possible to give a shocking character to the movement of the line, whereby the risk for inclusion of the granulate material in the wire elements 46 is reduced.

In another embodiment of the invention the same effect can be obtained by giving the circumferential surface of the reel 50 a suitable shape. If the core of the reel 50 has a non circular cross section it is possible to vary the lifting speed of the line. In order to assign a shocking character a polygonal cross section can be used. A simple embodiment is obtained by means of a reel in which between the two flange plates a number of pens has been mounted which in fact form the corner elements of a polygonal element. In FIG. 1 there is shown an hexagonal surface like that.

The different parameters of the filling process can be demonstrated as shown in the following scheme.

A. Variables which are applicable during the filling process with the filling machine
 1. Speed of the transport belt
 2. Height of the filling funnel with respect to the transport belt
 3. Height of the granular material in the filling funnel (total weight)
 4. Width of the filling funnel at the location of the discharge opening The parameters 1-4 define the volume of granular material per unit of time As a result the total time of passage defines the total volume.

B. During the filling of the tubes the following parameters are important:
 5. the same amount of granular material in all tubes
 6. no broken granular material in the tubes
 7. the pile-up of granular material must be as much as possible identical in the different tubes The parameters 5-7 are obtained by the use of the irregular lifting speed of the line according to the invention.
 8. No dust originating from the granular material in the tubes This is achieved by means of dust grooves in the discharge zone of the device.

The result is the same pressure difference (delta P) over all the tubes with the lowest variation or differences. (<variation over the total delta P range).

Another result is the same production for each tube and no hotspots.

C. Uniformity of the filling process.

This is obtained by:
 9. fixing the velocity of the transport belt (in stead of using buckets)
 10. adjusting the average lifting speed of the line,
 11. defining the frequency of the lifting movement The relationship between the parameters 9-11 is defined by the diameter of the tube.

Which elements are important for obtaining these targets:
 a. a one time fixing of the parameters based upon a number of experiments with tubes.
 b. eliminating as much as possible human failures.
 c. memorizing the filling data when stopping the machine.

It is obvious that the invention is not restricted to the described embodiments as shown in the annexed drawings, but that within the scope of the claims modifications can be applied without departing from the inventive concept.

The invention claimed is:

1. A process for filling a vertically oriented tube with granular material, which material is guided downwardly into the tube, comprising the steps of:
 positioning a line into the tube having transverse flexible elements substantially perpendicular to the line and which have a radial dimension smaller than the inner diameter of the tube,
 providing a line take-up reel having a non-circular outer line take-up profile to which an upper end of the line is connected, and
 rotating the take-up reel to wind the line about the non-circular line take-up profile for lifting the line as the tube is filled with granular material with the non-circular line take-up profile imparting shocking movement and forces to the line for impeding the accumulation of granular material on the transverse flexible elements as the line is lifted by the rotating take-up reel for preventing the accumulation of granular material on the transverse flexible elements.

2. The process according to claim 1 including rotating the take-up reel by a stepping motor, and controlling operation of the stepping motor by a series of irregular pulses for raising the line with irregular movement.

3. An apparatus for filling a tube with granular material comprising:
 an upwardly opening vertically oriented tube,
 a line disposed in said tube having a plurality of transverse flexible elements extending in substantially perpendicular relation to the line which have a radial dimension smaller than the inner diameter of the tube,
 a rotatable reel to which an upper end of the line is connected and about which the line can be wound for lifting the line and transverse flexible members from the tube as it is being filled with granular materials, and
 said reel having a non-circular line take-up surface profile about which the line is wound as an incident to rotation of the reel for imparting shocking movement to the line as it is raised from the tube for preventing the accumulation of the granular material on the transverse flexible elements.

4. The apparatus according to claim 3 in which a cross section of a circumferential surface of the reel has a square shape.

5. The apparatus of claim 3 in which said take-up reel has a non-circular take-up surface profile in the form of a polygon.

6. The apparatus of claim 3 in which said take-up reel has a hexagonal shaped take-up surface profile.

7. The apparatus of claim 3 in which said take-up reel is formed by a pair of flange plates interconnected by a plurality of transverse connecting pins that define corners of non-circular polygon profile.

8. The apparatus according to claim 3 including a stepping motor for rotatably driving the reel, and a control for providing a series of irregular pulses to the stepping motor effecting irregular rotational movement of the reel and corresponding irregular lifting movement of the line as it is lifted from the tube.

9. A process for filling a vertically oriented tube with granular material, which material is guided downwardly into the tube, comprising the steps of:

positioning a line into the tube having transverse flexible elements extending in substantially perpendicular relation to the line and which have a radial dimension smaller than the inner diameter of the tube, providing a take-up reel to which an upper end of the line is connected and about which the line can be wound as an incident to rotational movement of the take-up reel, rotatably driving the take-up reel by a stepping motor to wind the line about the take-up as the tube is filled with granular material, and controlling the stepping motor by a series of irregular pulses for winding the line about the take-up reel with irregular movement that imparts shocking forces to the line for impeding the accumulation of granular material on the transverse flexible elements as the line is lifted from the tube.

10. An apparatus for filling a tube with granular material comprising:

an upwardly opening vertically oriented tube, a line disposed in said tube having a plurality of transverse flexible elements extending in substantially perpendicular relation to the line and which have a radial dimension smaller than the inner diameter of the tube, a rotatable reel to which an upper end of the line is connected and about which the line can be wound for lifting the line and transverse flexible members from the tube as it is being filled with granular materials, a stepping motor for rotatably driving the reel, and a control for providing a series of irregular pulses to the stepping motor effecting irregular rotational movement of the reel and corresponding irregular movement of the line as it is lifted from the tube for imparting shocking movement to the line as it is raised from the tube for preventing the accumulation of granular material on the transverse flexible elements.

* * * * *